United States Patent [19]

Liu et al.

[11] Patent Number: 5,389,238
[45] Date of Patent: Feb. 14, 1995

[54] EBULLATED BED PROCESS WITH RECYCLE EDUCTOR

[75] Inventors: Edward K. Liu; John C. Strickland; Ting Y. Chan, all of Houston, Tex.

[73] Assignee: Texaco Inc., White Plains, N.Y.

[21] Appl. No.: 32,086

[22] Filed: Mar. 17, 1993

[51] Int. Cl.⁶ ............................................. C10G 13/02
[52] U.S. Cl. .................................. 208/157; 208/153; 208/158
[58] Field of Search .................. 208/157–158, 208/153

[56] References Cited

U.S. PATENT DOCUMENTS

| | | | |
|---|---|---|---|
| 3,363,992 | 1/1968 | Chervenak | 208/157 |
| 3,617,524 | 11/1971 | Conn | 208/157 |
| 3,680,217 | 8/1972 | Chapman | 34/9 |
| 3,868,761 | 6/1975 | Stewart | 208/112 |
| 4,684,456 | 8/1987 | Van Driesen et al. | 208/143 |
| 4,705,627 | 11/1987 | Miwa et al. | 210/264 |

*Primary Examiner*—Helane Myers
*Attorney, Agent, or Firm*—James L. Bailey; Kenneth R. Priem; Richard A. Morgan

[57] ABSTRACT

In an ebullated bed process the feedstock conduit is provided with at least 50 psi (4.4 atm) head in excess of a liquid-vapor separation pressure. The excess head is used in combination with an eductor to recycle a reactor effluent liquid. The expanded catalyst bed is thereby maintained at 110 vol % to vol % of a settled catalyst volume. A separate pump to expand (ebullate) the catalyst bed is not required.

6 Claims, 2 Drawing Sheets

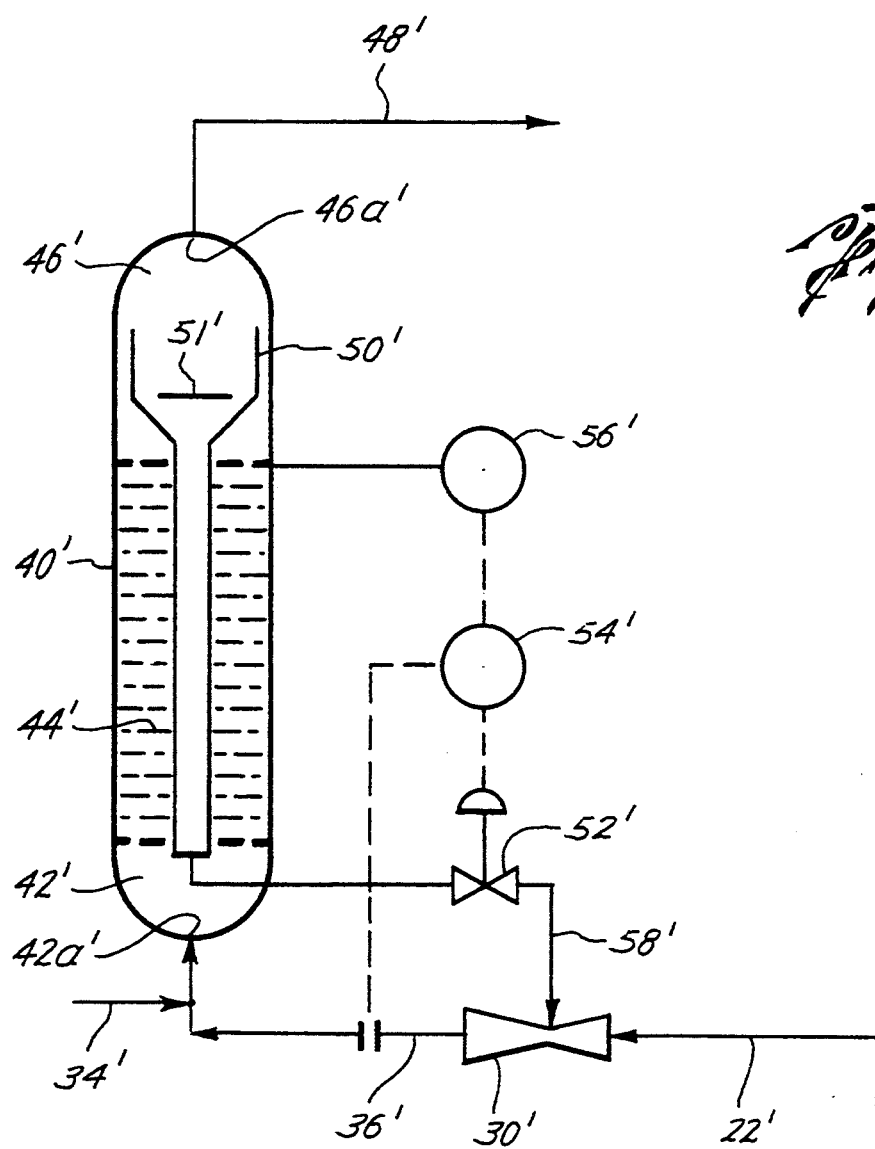
Fig. 2
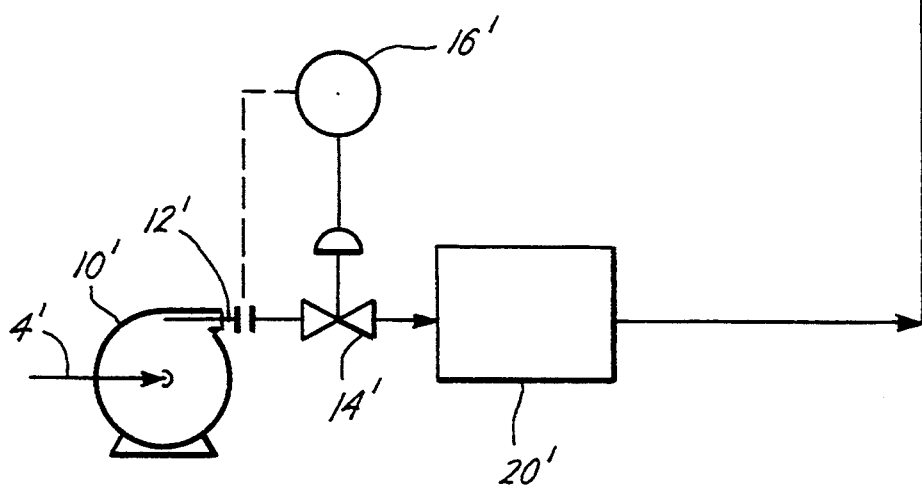

EBULLATED BED PROCESS WITH RECYCLE EDUCTOR

BACKGROUND OF THE INVENTION

1. Field Of The Invention

The invention relates to an ebullated bed process for the liquid phase hydrotreating of a hydrocarbon feedstock. The invention also relates to a recycle system with a liquid/liquid eductor for ebullating a catalyst bed.

2. Description Of Other Related Methods In The Field

The ebullated bed process comprises the passing of concurrently flowing streams of liquids or slurries of liquids and solids and gas upwardly through a vertically elongated cylindrical vessel containing a catalyst bed. The catalyst in the bed is maintained in random motion in the liquid and has a gross volume dispersed through the liquid greater than the volume of the catalyst when stationary. This technology has been used commercially in the upgrading of heavy liquid hydrocarbons or converting coal to synthetic oils.

The process is generally described in U.S. Pat. No. Re 25,770 to Johanson incorporated herein by reference. A mixture of hydrocarbon liquid and hydrogen is passed upwardly through a bed of catalyst particles at a rate such that the particles are forced into random motion as the liquid and gas flow upwardly through the bed. The random catalyst motion is controlled by recycle liquid flow so that at steady state, the bulk of the catalyst does not rise above a definable level in the reactor. Vapors along with the liquid which is being hydrogenated are removed at the upper portion of the reactor.

In an ebullated bed process the substantial amounts of hydrogen gas and light hydrocarbon vapors rise through the reaction zone into the catalyst free zone. Liquid from the catalyst free zone is both recycled to the bottom of the reactor to ebullate the catalyst bed and removed from the reactor as product. Vapor is separated from the liquid recycle stream before being passed through the recycle conduit to the recycle pump suction. The recycle pump (ebullation pump) maintains the expansion (ebullation) and random motion of catalyst particles at a constant and stable level by recycling liquid to the bottom of the reactor. The recycle pump for this service has a high suction pressure but a head of only 10 to 100 psi, typically 50 psi. Such pumps are commercially available and command a premium price. Because of the high suction pressure service, the support facilities for these pumps, e.g., high pressure seal oil system and variable speed drive system require frequent and expensive maintenance.

Reactors employed in a catalytic hydrogenation process with an ebullated bed of catalyst particles are designed with a central vertical recycle conduit which serves as the downcomer for recycling liquid from the catalyst free zone above the ebullated catalyst bed to the suction of a recycle pump to recirculate the liquid through the catalytic reaction zone. The recycling of liquid from the upper portion of the reactor serves to ebullate the catalyst bed, maintain temperature uniformity through the reactor and stabilize the catalyst bed.

U.S. Pat. No. 4,684,456 to R. P. Van Driesen et. al. teaches the control of catalyst bed expansion in an expanded bed reactor. In the process, the expansion of the bed is controlled by changing the reactor recycle pump speed. The bed is provided with high and low level bed detectors and an additional detector for determining abnormally high bed (interface) level. The interface level is detected by means of a density detector comprising a radiation source at an interior point within the reactor and a detection source in the reactor wall. Raising or lowering the bed level changes the density between the radiation source and the radiation detector. The vertical range of steady-state bed (interface) level as well as the highest and lowest steady-state interface level are design parameters.

U.S. Pat. No. 3,363,992 to M. C. Chervenak teaches a pumpless recycle system which is particularly adaptable to ebullating a catalyst bed. The recycle system relies on an elevated separator vessel to provide a liquid head in the absence of a recycle pump.

U.S. 3,617,524 to A. L. Conn teaches an ebullated bed process in which an eductor is used to inject a high velocity hydrogen stream into a hydrocarbon oil feedstock.

SUMMARY OF THE INVENTION

The invention is an ebullated bed process in which a liquid hydrocarbon feedstock is hydroprocessed in an expanded catalyst bed contained in a reactor vessel. The feedstock is passed through a feedstock conduit to a lower portion of the reactor vessel and upwardly through the expanded catalyst bed to an upper portion of the reactor vessel. An effluent is separated into a liquid phase effluent and a vapor phase effluent at a separation pressure.

The improvement is characterized in providing a head in the feedstock conduit at least 50 psi (4.4 atm) above the separation pressure. The head is used for educating a portion of the liquid phase effluent into the feedstock conduit at a rate of 1.0 to 10 times the feedstock rate. As a result the expanded catalyst bed volume is maintained at the required 110 vol % to 200 vol % of a settled catalyst volume.

BRIEF DESCRIPTION OF THE DRAWING

FIG. 2 is a sectional elevated view of the reactor vessel with a separator internal to the reactor vessel.

DETAILED DESCRIPTION OF THE INVENTION

Figure 1:
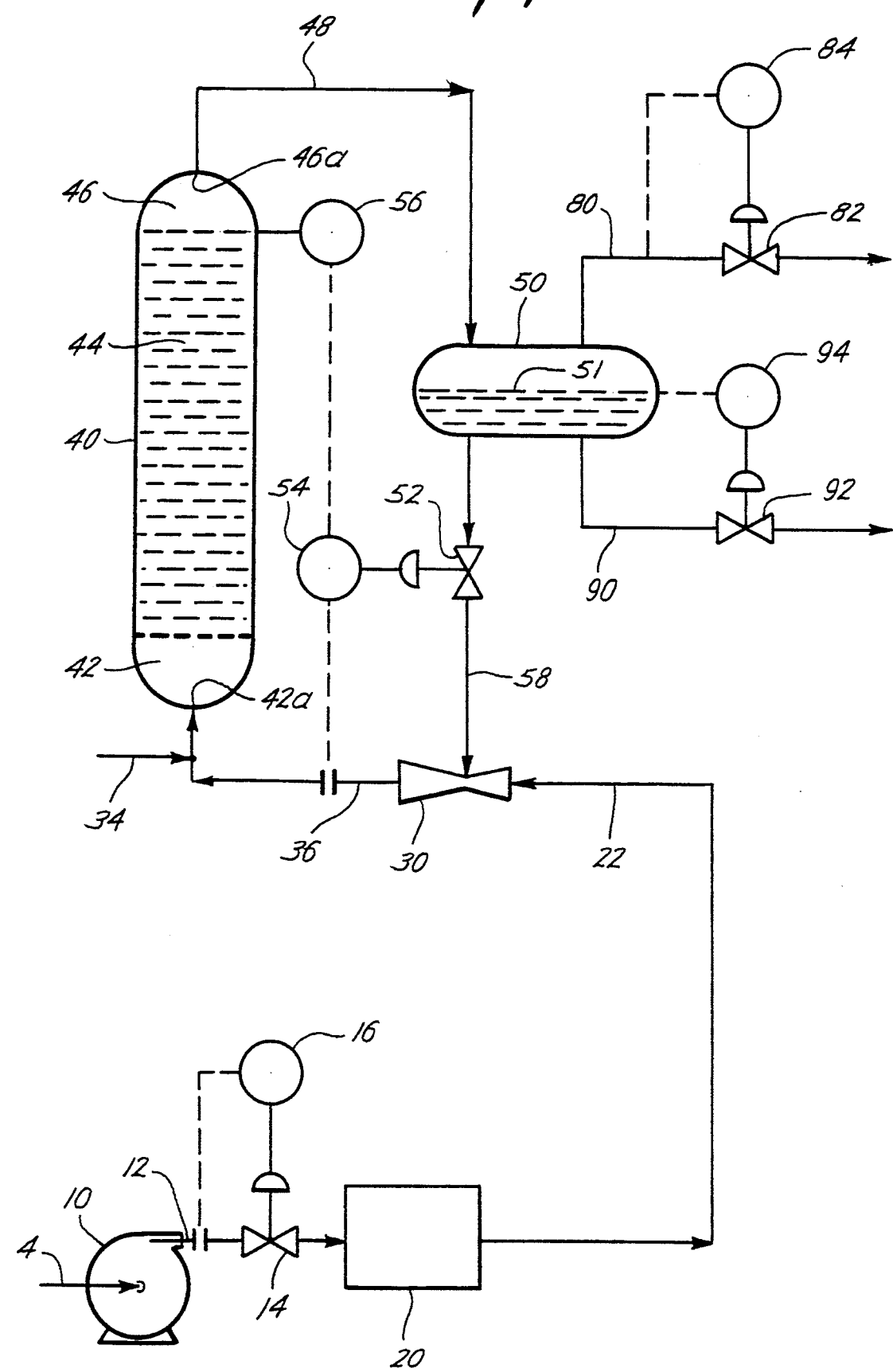
FIG. 1 is a sectional elevated view of the reactor vessel with a separator vessel external to the reactor vessel.

In order to demonstrate and provide a better understanding of the invention, reference is made to the FIG. 1.

Reactor vessel 40 is positioned with its long axis in a vertical position and is generally of a circular cross-section. Although this drawing is schematic in order to show its various features, it will be understood that the reactor vessel is constructed in such a fashion and from such materials that it is suitable for reacting liquids, solids and gases at elevated temperatures and pressures and in a preferred embodiment for treating hydrocarbon, hydrocarbon liquids with hydrogen in the presence of solid particulate catalyst at high pressures and temperatures, e.g., 300 to 5000 psia (20.4 to 341 atm) and 400° F. to 1500° F. (343° C. to 815° C.).

Conventional feedstocks for the ebullated bed process include heavy and intermediate distillate fractions from crude petroleum which can be upgraded by hydrocracking or hydrotreating.

Hydrocracking feedstocks for the ebullated bed process include petroleum residua such as petroleum atmospheric distillation bottoms, vacuum distillation bottoms, asphalter bottoms, shale oil, shale oil residues, tar sands, bitumen, coal derived hydrocarbons, hydrocarbon residues, lube extracts and mixtures thereof.

Hydrotreating feedstocks are intermediate petroleum distillates such as gasoline, naphtha, kerosene, diesel oil and mixtures thereof. Heavier petroleum distillates include gas oil, vacuum gas oil and mixtures thereof.

A liquid hydrocarbon feedstock is passed via line 4 to the suction of feedstock pump 10 where the pressure is raised to a pressure sufficient to overcome reactor vessel pressure in order to enter reactor vessel 40. Generally, this pressure must exceed 300 to 5000 psia (20.4 to 341 atm) reactor pressure and any line losses. Pump 10 forces feedstock at elevated pressure into line 12 under flow control of valve 14 and controller 16. Feedstock is passed through heater 20 which is representative of a number of means for heating the feedstock including feed/effluent heat exchangers and a fired furnace. Heated feedstock is passed through feedstock conduit 22 and eductor 30 which educts a liquid phase effluent from line 58 into feedstock conduit 22. Eduction requires a pressure differential of at least 50 psi (4.4 atm), typically 100 psi (6.8 atm) to 1500 psi (102 atm) which is the motive force for drawing a liquid phase effluent recycle from recycle conduit 58 into feedstock conduit 22. A combined feedstock and recycle liquid is passed via conduit 36 into reactor vessel 40.

A hydrogen-containing gas comprises at least 50 vol % hydrogen, preferably at least 85 vol % hydrogen. The hydrogen-containing gas enters the process via line 34 at a temperature of about 200° F. (93° C.) to 1500° F. (815° C.) and a pressure of at least 300 psia (20.4 atm) to 5000 psia (341 atm) provided by a hydrogen compressor and heaters (not shown) dedicated to this service.

Reactor vessel 40 contains an expanded catalyst bed 44 of solid particulate catalyst at hydroprocessing reaction conditions. Hydroprocessing reaction conditions preferably include a temperature of 500° F. (260° C.) to 950° F. (510° C.), hydrogen partial pressure of 100 psia (6.8 atm) to 3000 psia (204 atm) and a liquid hourly space velocity (LHSV) within the range of 0.1 to 5.0 vol of feed/hour/reactor volume. Hydrotreating is most preferably carried out at a temperature of 700° F. (371° C.) to 850° F. (454° C.) and a reaction pressure of 300 psia (20.4 atm) to 1200 psia (82 atm). Hydrocracking is most preferably carried out at a temperature of 600° F. (315° C.) to 850° F. (454° C.) and reaction pressure of 800 psia (54.4 atm) to 2000 psia (136 atm). These particular hydrocracking and hydrotreating conditions are selected based on experience and it is understood that the full range of operating conditions is contemplated in optimizing the hydroprocessing of a particular feedstock.

Preferable ebullated bed hydroprocessing catalyst comprises active metals, for example Group VIB salts and Group VIIIB salts on an alumina support of 60 mesh to 270 mesh having an average pore diameter in the range of 80 to 120Å and at least 50% of the pores having a pore diameter in the range of 65 to 150Å. Alternatively, catalyst in the form of extrudates or spheres of ¼ inch to 1/32 inch diameter may be used. Group VIB salts include molybdenum salts or tungsten salts selected from the group consisting of molybdenum oxide, molybdenum sulfide, tungsten oxide, tungsten sulfide and mixtures thereof. Group VIIIB salts include a nickel salt or cobalt salt selected from the group consisting of nickel oxide, cobalt oxide, nickel sulfide, cobalt sulfide and mixtures thereof. The preferred active metal salt combinations are the commercially available nickel oxide-molybdenum oxide and the cobalt oxide-molybdenum oxide combinations on alumina support.

Reactor vessel 40 is provided with inlet 42a providing fluid communication to lower reactor vessel 42. Hydrocarbon feedstock and hydrogen-containing gas pass upwardly through the expanded catalyst bed 44 to the upper reactor vessel 46. A mixed phase reaction effluent is withdrawn from outlet 46a and passed via conduit 48 to separator vessel 50.

The mixed phase reactor effluent is separated at a separation pressure approximately equal to reaction pressure and with 0.5 to 5 minutes residence time in separator vessel 50 into a vapor phase effluent and a liquid phase effluent. Vapor phase effluent is withdrawn from separator vessel 50 via conduit 80 under pressure control provided by control valve 82 and pressure controller 84.

Liquid level 51 is maintained in separator vessel 50 by means of level controller 94 which provides a control signal to control valve 92 positioned to regulate the flow of liquid phase effluent from separator vessel 50 via conduit 90. Liquid phase effluent withdrawn via line 90 is the hydroprocessed product of the ebullated bed process.

Liquid recycle conduit 58 extends from separator vessel 50 to feedstock conduit 22. Eductor 30 provides fluid communication between liquid recycle conduit 58 and feedstock conduit 22.

Control of liquid phase effluent flow through liquid recycle conduit 58 is regulated by control valve 52 which receives a flow control signal from flow controller 54. Flow controller 54 provides sufficient flow through conduit 36 to ebullate the expanded catalyst bed to a volume 110 vol % to 200 vol % of settled catalyst volume. This is the amount of catalyst bed expansion required by the ebullated bed process. The expansion of the catalyst bed is measured by catalyst level controller 56 which detects a catalyst interface and provides a set point signal to flow controller 54. Typically, a recycle rate in liquid recycle conduit 58 of 1.0 to 10 times the feedstock rate in conduit 22 provides the catalyst bed expansion of 110 vol % to 200 vol % of a settle catalyst volume. Settled catalyst density is generally in the range of 30 to 50 lb/ft$^3$, typically 37 lb/ft$^3$.

Reference is made to FIG. 2. A liquid hydrocarbon feedstock is passed via line 4' to the suction of feedstock pump 10' where the pressure is raised to a pressure sufficient to overcome reactor vessel pressure in order to enter reactor vessel 40'. Pump 10' forces feedstock at elevated pressure into line 12' under flow control of valve 14' and controller 16'. Feedstock is passed through heater 20'. Heated feedstock is passed through feedstock conduit 22' and eductor 30' which educts a liquid phase effluent from line 58' into feedstock conduit 22'. The hydrogen-containing gas enters the process via line 34' into conduit 36' and the combined stream enters reactor vessel 40'.

Reactor vessel 40' is provided with inlet 42a' providing fluid communication to lower reactor vessel 42'. Hydrocarbon feedstock and hydrogen-containing gas pass upwardly through the expanded catalyst bed 44'. A mixed phase reaction effluent is passed to recycle cup 50' which is a liquid-vapor separator.

The mixed phase reactor effluent is separated at separation pressure equal to reactor pressure and with residence time of 0.5 to 5 minutes in recycle cup 50' into a vapor phase effluent and a liquid phase effluent. Separated vapor phase effluent passes from recycle cup 50' to the upper part of reactor vessel 46' and is withdrawn via outlet 46a' and conduit 48' under pressure control (not shown). Vapor phase effluent withdrawn via conduit 48' is the hydroprocessed product of the ebullated bed process and includes unreacted hydrogen gas.

Liquid level 51' is maintained in recycle cup 50' by hydraulic design of recycle cup 50' and recycle conduit 58'. Liquid recycle conduit 58' extends from recycle cup 50' to feedstock conduit 22'. Eductor 30' provides fluid communication between liquid recycle conduit 58' and feedstock conduit 22'.

Control of liquid phase effluent flow through liquid recycle conduit 58' is regulated by control valve 52' which receives a flow control signal from flow controller 54'. Flow controller 54' provides sufficient flow through conduit 36' to ebullate the expanded catalyst bed to a volume 110 vol % to 200 vol % of settled catalyst volume. The expansion of the catalyst bed is measured by catalyst level controller 56' which detects a catalyst interface and provides a set point signal to flow controller 54'.

The process is adapted to an ebullate bed process configured with the liquid-vapor separator either internal or external to the reactor vessel.

Eductors are a means for converting a static pressure head to kinetic energy. Their function is described by Bernoulli's theorem. A motive fluid at elevated pressure is passed through a venturi nozzle and as a result the fluid experiences a drop in pressure. The venturi nozzle is configured so that the pressure drop causes suction to be drawn on a chamber containing a static fluid. The static fluid is entrained into the motive fluid and the two are discharged together from the eductor body.

The design of eductors is well-known in the art. For example, design is fully described in *Perry's Chemical Engineers' Handbook*, 4th ed., pp. 6–13 to 6–32 incorporated herein by reference.

This invention is shown by way of Example.

EXAMPLE

An ebullated bed process is operated as shown in FIG. 1. Feedstock is a hydrocracker gas oil. Recycle is kerosene and diesel.

The design equations for an eductor are expressed as follows:

$$\text{Head Ratio } R_H = \frac{P_1 - P_s}{P_2 - P_s} \times \frac{SG_2}{SG_1}$$

$$\text{Weight Ratio } R_W = E_R (R_H)^{0.5} - 1 = \frac{W_s}{W_1}$$

$$\text{Volume Ratio } R_Q = R_W \times \frac{SG_1}{SG_s} = \frac{Q_s}{Q_1}$$

where:

| NOMENCLATURE | | |
|---|---|---|
| Feedstock Fluid | Recycle Fluid | Discharge |
| (Motive Fluid) | (Suction Fluid) | Fluid |
| Pressure $P_1$ | $P_s$ | $P_2$ |
| Volumetric Flow Rate $Q_1$ | $Q_s$ | $Q_2$ |
| Weight Flow Rate $W_1$ | $W_s$ | $W_2$ |
| Specific Gravity $SG_1$ | $SG_s$ | $SG_2$ |

Eductor Efficiency Factor $E_R$

| | | |
|---|---|---|
| $Q_1$ | 1890 | gallons/minute |
| $Q_s$ | 5549 | gallons/minute |
| $P_2$ | 1215 | psig |
| $P_s$ | 1180 | psig |
| $SG_1$ | 0.784 | |
| $SG_s$ | 0.665 | |
| $SG_2$ | 0.695 | |
| $R_Q$ | 2.94 | |
| $R_W$ | 2.49 | |
| $R_H$ | 16.86 | |
| $P_1$ | 1846 | psig |

It is calculated that the feedstock pump would have to produce a $P_1$ pressure of 1846 psig and would require a motor having 2781 horsepower to ebullate the bed to 110 vol % to 200 vol % of settled catalyst volume. A separate recycle pump or ebullation pump is not required.

The replacement of the ebullation pump with an eductor significantly reduces investment cost of building a process unit. Due to the high suction pressure, the ebullation pump is very expensive due to support systems, including a variable speed drive system and a high pressure seal oil system. The maintenance cost is very high. In contrast, an eductor has no moving parts and maintenance cost is significantly lower.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. An ebullated bed process carried out in a reactor vessel wherein a liquid hydrocarbon feedstock is passed through a feedstock conduit at a feedstock rate to a lower portion of a reactor vessel, and upwardly through an expanded catalyst bed to an upper portion of the reactor vessel from which an effluent is withdrawn, and separating the effluent at a separation pressure into a liquid phase effluent and a vapor phase effluent, wherein the improvement comprises:

providing a head in the feedstock conduit at least 50 psi (4.4 atm) above the separation pressure, and educting a portion of said liquid phase effluent by means of the head into the feedstock conduit at a recycle rate to maintain an expanded catalyst bed volume at 110 vol % to 200 vol % of a settled catalyst bed volume.

2. The ebullated bed process of claim 1 wherein the head is 100 psi (6.8 atm) to 1500 psi (102 atm) above the separation pressure.

3. The ebullated bed process of claim 1 wherein the recycle rate is 1.0 to 10.0 times the feedstock rate.

4. An ebullated bed process carried out in a reactor vessel wherein a liquid hydrocarbon feedstock is passed through a feedstock conduit at a feedstock rate to a lower portion of a reactor vessel, and upwardly through an expanded catalyst bed to an upper portion of the reactor vessel, and separating at a separation pressure to produce a liquid phase effluent and a vapor phase effluent, wherein the improvement comprises:
providing a head in the feedstock conduit at least 50 psi (4.4 atm) above the separation pressure, and
educting a portion of said liquid phase effluent by means of the head into the feedstock conduit at a recycle rate to maintain an expanded catalyst bed volume at 110 vol % to 200 vol % of a settled catalyst bed volume.

5. The ebullated bed process of claim 4 wherein the head is 100 psi (6.8 atm) to 1500 psi (102 atm) above the separation pressure.

6. The ebullated bed process of claim 4 wherein the recycle rate is 1.0 to 10.0 times the feedstock rate.

* * * * *